United States Patent [19]
Kimura et al.

[11] Patent Number: 5,526,262
[45] Date of Patent: Jun. 11, 1996

[54] AUTOMOTIVE SUSPENSION CONTROL SYSTEM UTILIZING VARIABLE DAMPING FORCE SHOCK ABSORBER

[75] Inventors: Makoto Kimura; Fumiyuki Yamaoka; Shinobu Kakizaki; Toru Takahashi; Mitsuo Sasaki, all of Atsugi, Japan

[73] Assignee: Atsugi Unisia Corporation, Kanagawa, Japan

[21] Appl. No.: 997,168

[22] Filed: Dec. 24, 1992

[30] Foreign Application Priority Data

Dec. 26, 1991 [JP] Japan .................................. 3-345309
Jan. 14, 1992 [JP] Japan .................................. 4-004293

[51] Int. Cl.⁶ ......................................... B60G 17/00
[52] U.S. Cl. ................... 364/424.05; 280/707; 280/840; 180/41
[58] Field of Search ......................... 361/424.05, 426.04; 280/707, 840, 6.1, 6.11, 688; 188/378, 381; 180/41

[56] References Cited

U.S. PATENT DOCUMENTS

| | | | |
|---|---|---|---|
| Re. 34,628 | 7/1994 | Fujishiro et al. | 280/707 |
| 3,807,678 | 4/1974 | Karnopp et al. | 248/358 |
| 4,714,271 | 12/1987 | Buma et al. | 280/707 |
| 4,838,574 | 6/1989 | Baraszu | 280/707 |
| 4,905,152 | 2/1990 | Kawabata | 364/424.05 |
| 4,970,645 | 11/1990 | Adachi et al. | 364/424.05 |
| 5,062,659 | 11/1991 | Edahiro et al. | 280/707 |
| 5,088,760 | 2/1992 | Kakizaki et al. | 280/707 |
| 5,158,161 | 10/1992 | Yamaoka et al. | 280/707 |
| 5,162,996 | 11/1992 | Matsumoto et al. | 364/424.05 |
| 5,203,584 | 4/1993 | Butsuen et al. | 280/707 |
| 5,289,380 | 2/1994 | Kimura | 364/424.05 |

FOREIGN PATENT DOCUMENTS

| | | | |
|---|---|---|---|
| 0220658 | 5/1987 | European Pat. Off. | |
| 3818188 | 12/1989 | Germany | |
| 61-163011 | 7/1986 | Japan | B60G 17/00 |
| 63-93203 | 6/1988 | Japan | B60G 17/00 |

OTHER PUBLICATIONS

Translation of German Office Action.

*Primary Examiner*—Kevin J. Teska
*Assistant Examiner*—Tan Q. Nguyen
*Attorney, Agent, or Firm*—Ronald P. Kananen

[57] ABSTRACT

A suspension control system for an automotive vehicle is provided. This suspension control system comprises variable damping force shock absorbers and a control unit which controls the shock absorbers to assume damping force characteristics in a range between preselected higher and lower damping coefficients. The control unit is operable to provide a control parameter indicative of bouncing motion of a vehicle body based on sprung vertical speed to determine a damping coefficient against the bouncing motion. When the control parameter is greater than a threshold value, the damping coefficient is modified to a lower value, while when the control parameter is less than the threshold value, the damping coefficient is modified to a higher value. With this damping coefficient modification, the bouncing motion is suppressed effectively while assuring passenger comfort.

10 Claims, 18 Drawing Sheets

AUTOMOTIVE SUSPENSION CONTROL SYSTEM UTILIZING VARIABLE DAMPING FORCE SHOCK ABSORBER

BACKGROUND OF THE INVENTION

1. Field of The Invention

The present invention relates generally to a suspension control system for an automotive vehicle which utilizes variable damping force shock absorbers for suppressing bouncing, pitching, and rolling motions of a vehicle body. More particularly, the invention is directed to a suspension control system which is operable to modify damping coefficients of shock absorbers for attenuating bouncing motion caused by high frequency vibrations transmitted from a road surface effectively while securing riding comfort.

2. Description of The Prior Art

Japanese Utility Model First Publication No. 63-93203 discloses an automotive suspension control system which utilizes variable damping force shock absorbers. This suspension control system is operable to detect vertical speed of a vehicle body and relative speed between the vehicle body and a road wheel as control parameters for modifying damping force characteristics of the shock absorbers. When the vertical speed is in an upward direction and the relative speed is increased or when the vertical speed is in a downward direction and the relative speed is decreased, the shock absorbers of all wheels are controlled to assume softer damping force characteristics respectively.

However, in such a prior art suspension control system, when vehicle attitude change of bouncing, pitching, and rolling motions occurs, causing an inertial moment with respect to the center of gravity of a vehicle body to act on a sprung mass, damping forces of shock absorbers are modified to assume harder damping force characteristics for suppressing the pitching and rolling motions greatly to secure traveling stability. With this harder damping force characteristic modification, the damping force against the bouncing motion tends to be undesirably great. In other words, the damping force becomes greater than necessary for suppressing the bouncing motion appropriately while assuring passenger comfort.

Additionally, Japanese Patent First Publication No. 61-163011 discloses a suspension control system similar to the above discussed conventional system. This suspension control system is responsive to high frequency vibrations input from a road surface to control damping force to exhibit harder or softer damping force characteristics dependent upon a direction of the vibrations. However, such a conventional suspension control system encounters a drawback in that a response rate of damping force modification tends to be delayed due to time, and for processing a control program and operation of an actuator varying damping force of a shock absorber. Therefore, while vibration attenuation is improved against low frequency input to a vehicle body, riding comfort tends to be degraded when a vehicle traveling on an uneven road causing high frequency vibrations to be transmitted to the vehicle body.

SUMMARY OF THE INVENTION

It is therefore a principal object of the present invention to avoid the disadvantages of the prior art.

It is another object of the present invention to provide a suspension control system which serves to suppress vehicle attitude change effectively due to an inertial moment acting on a vehicle body to secure traveling stability while assuring passenger comfort against bouncing motion due to high frequency vibration input from a road surface.

According to one aspect of the present invention, there is provided a suspension control system for an automotive vehicle which comprises shock absorbers disposed between a vehicle body and suspension members rotatably supporting wheels respectively, each shock absorber being controllable to assume damping force characteristics in a range between preselected higher and lower damping coefficients, a vertical acceleration sensor means for determining vertical acceleration acting on the vehicle body to provide a signal indicative thereof, and a control means responsive to the signal from the vertical acceleration sensor means to provide a preselected control parameter relating to bouncing motion. The control means provides first control signals to the shock absorbers respectively to modify the damping force characteristics so as to assume a first damping coefficient against the bouncing motion of the vehicle body when the control parameter is smaller than a preselected threshold value and second control signals to the shock absorbers respectively to modify the damping force characteristics so as to assume a second damping coefficient which is smaller than the first damping coefficient in a direction of the lower damping coefficient against the bouncing motion when the control parameter is greater than the preselected threshold value. With this arrangement, the suspension control system serves to suppress the bouncing motion of the vehicle body effectively while assuring riding comfort.

In the preferred mode, the preselected control parameter may include a value of the vertical acceleration acting on an sprung mass. Alternatively, the preselected control parameter may include a frequency component greater than or equal to unsprung resonance frequencies.

BRIEF DESCRIPTION OF THE DRAWINGS

The present invention will be understood more fully from the detailed description given hereinbelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENT

Figure 1:
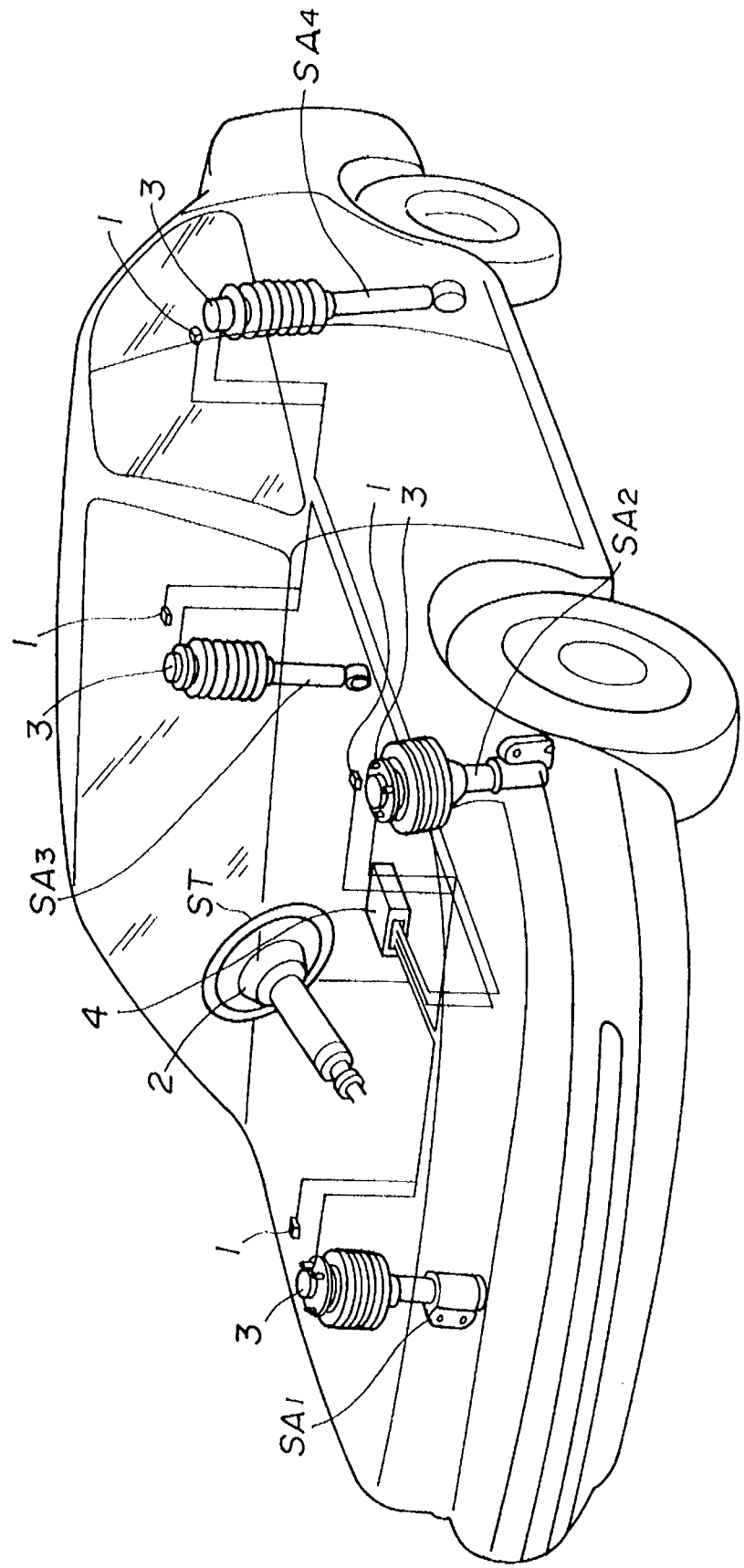
FIG. 1 is a perspective view which shows an automotive vehicle incorporating a suspension control system according to the present invention.
Figure 2:
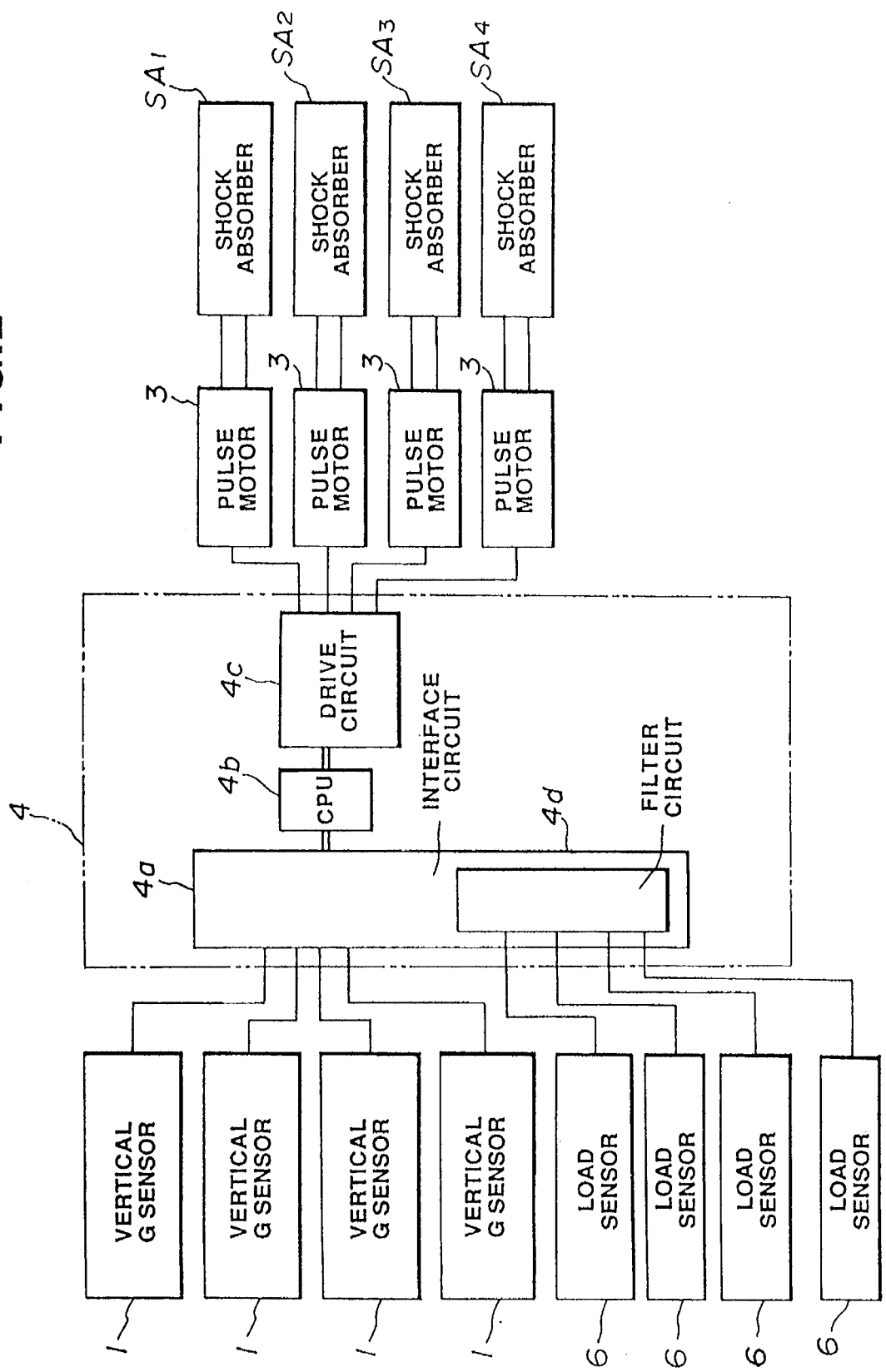
FIG. 2 is a block diagram which shows a suspension control system of the invention.

Referring now to the drawings, particularly to FIGS. 1 and 2, a suspension control system according to the present invention is shown. This control system comprises generally four suspension units which include front-right, front-left, rear-right, and rear-left shock absorbers $SA_1$, $SA_2$, $SA_3$, and $SA_4$, vertical acceleration sensors 1 (hereinafter, referred to as a vertical G sensor), load sensors 6, pulse motors 3 for the shock absorbers, and a control unit 4. The shock absorber as generally referred to will be hereafter represented by "SA".

The shock absorber SA is disposed between a vehicle body and a suspension member supporting a road wheel rotatably. The vertical G sensors 1 are mounted on portions of the vehicle body adjacent the shock absorbers for monitoring vertical accelerations acting on the vehicle body respectively to provide signals indicative thereof to the control unit 4. The load sensors 6 are installed on mounting members of the shock absorbers SA on the vehicle body and respectively serve to detect damping force F created in the shock absorber SA as a parameter indicating relative speed VR between the vehicle body (i.e., a sprung mass) and the wheel (i.e., a unsprung mass). The control unit 4 is arranged adjacent a driver's seat and is operable to provide control signals to the pulse motors 3 for modifying damping force characteristics of the shock absorbers SA respectively to suppress vehicle attitude change.

The control unit 4 includes an interface circuit 4a, a CPU (Central Processing Unit) 4b, and a drive circuit 4c. Sensor signals from the vertical G sensors 1 and the load sensors 6 are input to the interface circuit 4a. The interface circuit 4a includes four filter circuits 4a which are connected to the vertical G sensors 1 respectively.

Figure 3:
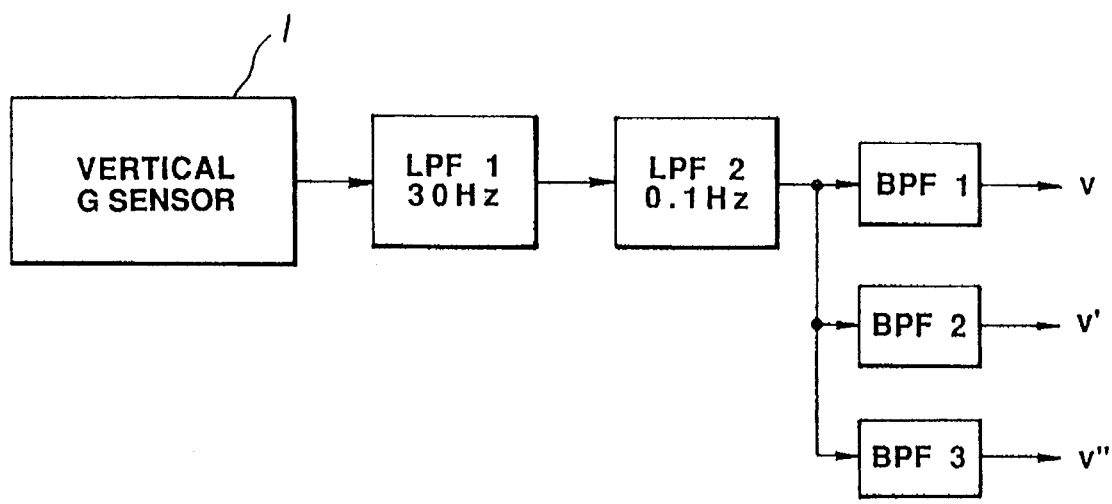
FIG. 3 is a block diagram which shows a filter circuit incorporated in a control unit of a suspension control system.

Referring to FIG. 3, each of the filter circuits 4a includes low-pass filters LPF1 and LPF2, and band-pass filters BPF1, BPF2, and BPF3. The low-pass filter LPF1 serves to attenuate noise in a high frequency range (more than 30 Hz) included in a sensor signal from the vertical G sensor 1. The low-pass filter LPF2 serves to integrate a value of the sensor signal passed through the low-pass filter LPF1 indicative of vertical acceleration to determine sprung vertical speed VS in vehicle attitude change. The band-pass filter BPF1 serves to transmit a given band including sprung resonance frequencies to provide a bouncing motion component v (the bouncing motion components which correspond to the shock absorbers $SA_1$, $SA_2$, $SA_3$, and $SA_4$ will be represented by the reference symbols $v_1$, $v_2$, $v_3$, and $v_4$ respectively). The band-pass filter BPF2 serves to transmit a given band including pitching resonance frequencies to provide a pitching motion component v' (the pitching motion components which correspond to the shock absorbers $SA_1$, $SA_2$, $SA_3$, and $SA_4$ will be represented by the reference symbols $v'_1$, $v'_2$, $v'_3$, and $v'_4$ respectively). The band-pass filter BPF3 serves to transmit a given band including rolling resonance frequencies to provide a rolling motion component v" (the rolling motion components which correspond to the shock absorbers $SA_1$, $SA_2$, $SA_3$, and $SA_4$ will be likewise represented by the reference symbols $v''_1$, $v''_2$, $v''_3$, and $v''_4$ respectively). When the sprung resonance frequencies, the pitching resonance frequencies, and the rolling frequencies fall in a similar frequency range, the filter circuit 4d may alternatively be provided with only one band-pass filter BPF1.

Figure 4:
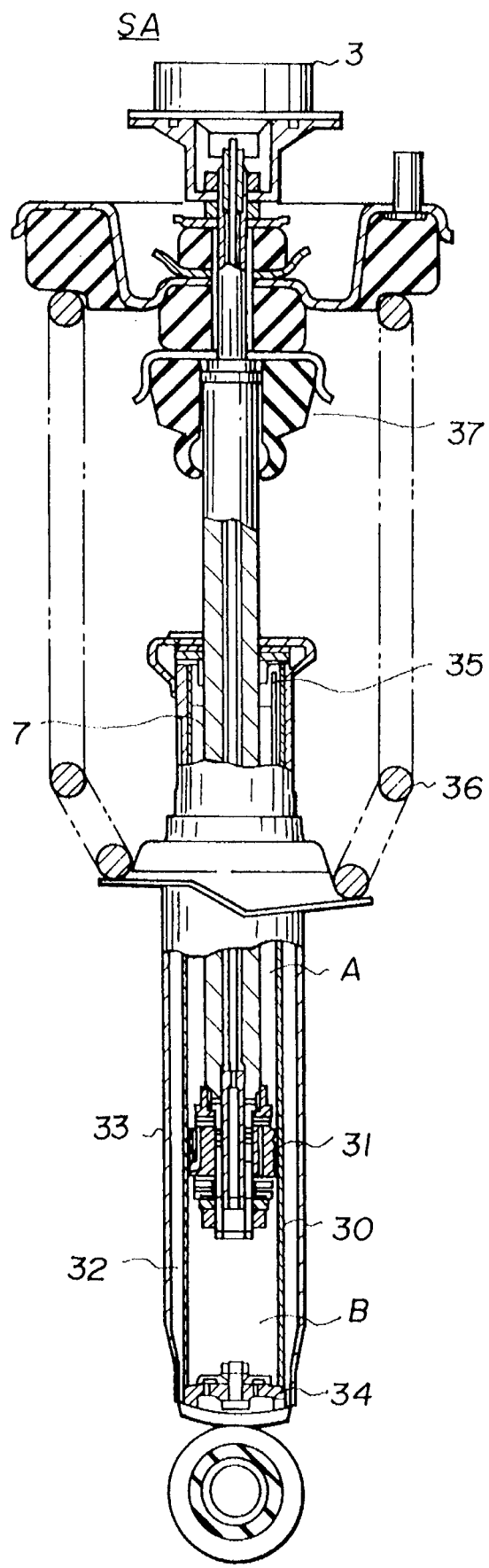
FIG. 4 is a cross-sectional view which shows a variable damping force shock absorber utilized for suppressing vehicle attitude change.

Referring to FIG. 4, a cross-sectional structure of the shock absorber SA is shown. The shock absorber SA includes an inner cylinder 30, a piston assembly 31 for defining upper chamber and lower chamber A and B, an outer cylinder 33 for defining a reservoir chamber 32 between the outer cylinder 33 and the inner cylinder 30, a base or bottom member 34 for defining the lower chamber B and the reservoir chamber 32, a guide member for guiding slide movement of a piston rod 7 linked to the piston assembly 31, a suspension spring 36 interposed between a flange installed on the outer cylinder 33 and the vehicle body, and a bumper rubber member (or bushing) 37.

Figure 5:
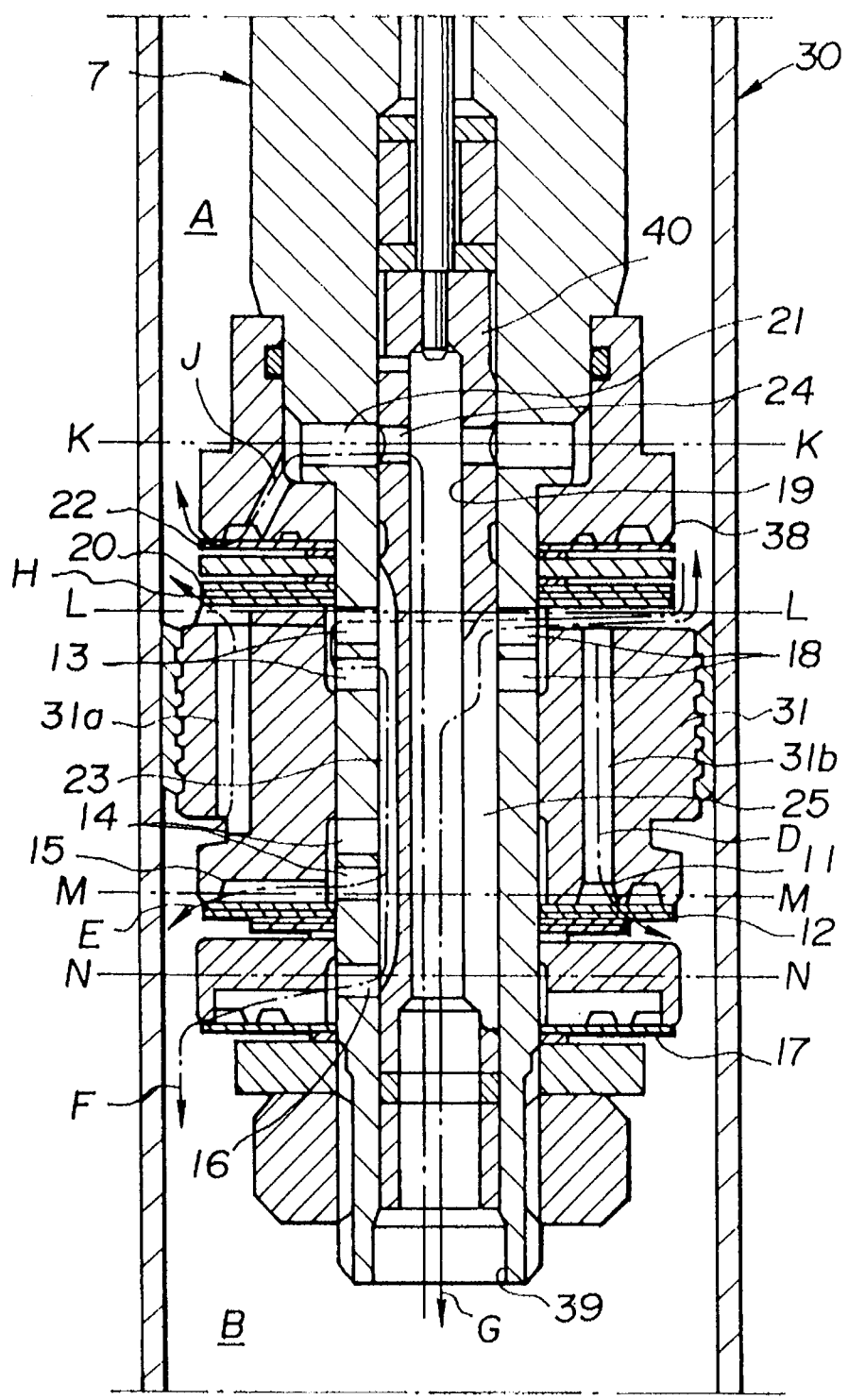
FIG. 5 is an enlarged cross-sectional view which shows a piston assembly of a shock absorber.

Referring to FIG. 5, there is shown a cross-sectional structure of the piston assembly 31. The piston assembly 31 includes penetrating holes 31a and 31b, an extension phase damping valve 12, and a compression phase damping valve 20. The extension and compression phase damping valves 12 and 20 serve to open and close the penetrating holes 31a and 31b respectively.

The piston assembly 31 further includes the piston rod 7, a communication hole 39, an adjusting pin 40, an extension phase check valve 17, a compression phase check valve 22, and a retainer 38 as a valve seat for the check valve 22. The piston rod 7 passes through the piston assembly 31. The communication hole 39 is formed in an end portion of the piston rod 7 which fluidly communicates between the upper chamber A and the lower chamber B. The adjusting pin 40 includes a hollow portion 19, a lateral hole 24, an axial slot 25, and a longitudinal groove 23 in an outer periphery thereof. The adjusting pin 40 is supported by the piston rod 7 so as to be allowed to circumferentially rotate for modifying a flow passage cross-sectional area of the communication hole 39. The rotational movement of the adjusting pin 40 is, as shown in FIG. 3, controlled by the pulse motor 3. The extension phase check valve 17 is operable to allow a working fluid to flow from the upper to lower chambers A and B, while the compression phase check valve 22 allows fluid flow from the lower to upper chambers B and A. Additionally, provided in an end portion of the piston rod 7 are a first port 21, a second port 13, a third port 18, a fourth port 14, and a fifth port 16 (as they will be referred to hereinafter).

Hence, four fluid flow passages are formed between the upper chamber A and the lower chamber B as fluid flow communicable passages during an extension or rebounding stroke of the shock absorber SA:

1) a first extension phase passage D directing fluid flow from the penetrating hole 31b to the lower chamber B through an inner side of the opened extension phase damping valve 12;

2) a second extension phase passage E directing fluid flow from the second port 13, the longitudinal hole 23, and the fourth port 14 to the lower chamber B through the outer periphery of the extension phase damping valve 12;

3) a third extension phase passage F directing fluid flow from the second port 13, the longitudinal hole 23, and the fifth port 16 to the lower chamber B via the opened extension phase check valve 17; and 4) a bypass flow passage G directing fluid flow from the third port 18 to the lower chamber B through the axial slot 25 and the hollow portion 19.

For the compression phase or during a bounding stroke of the shock absorber SA, the following three passages are provided as the fluid flow passages:

1) a first compression phase flow passage H directing fluid flow from the penetrating hole 31a to the upper chamber A through the opened compression phase damping valve 20;

2) a second compression phase flow passage J directing fluid flow from the hollow portion 19, the lateral hole 24, and the first port 21 to the upper chamber A through the opened compression phase check valve 22; and 3) a bypass flow passage G directing fluid flow from the hollow portion 19, the axial slot 25 and the third port 18 to the upper chamber A.

Figure 6:
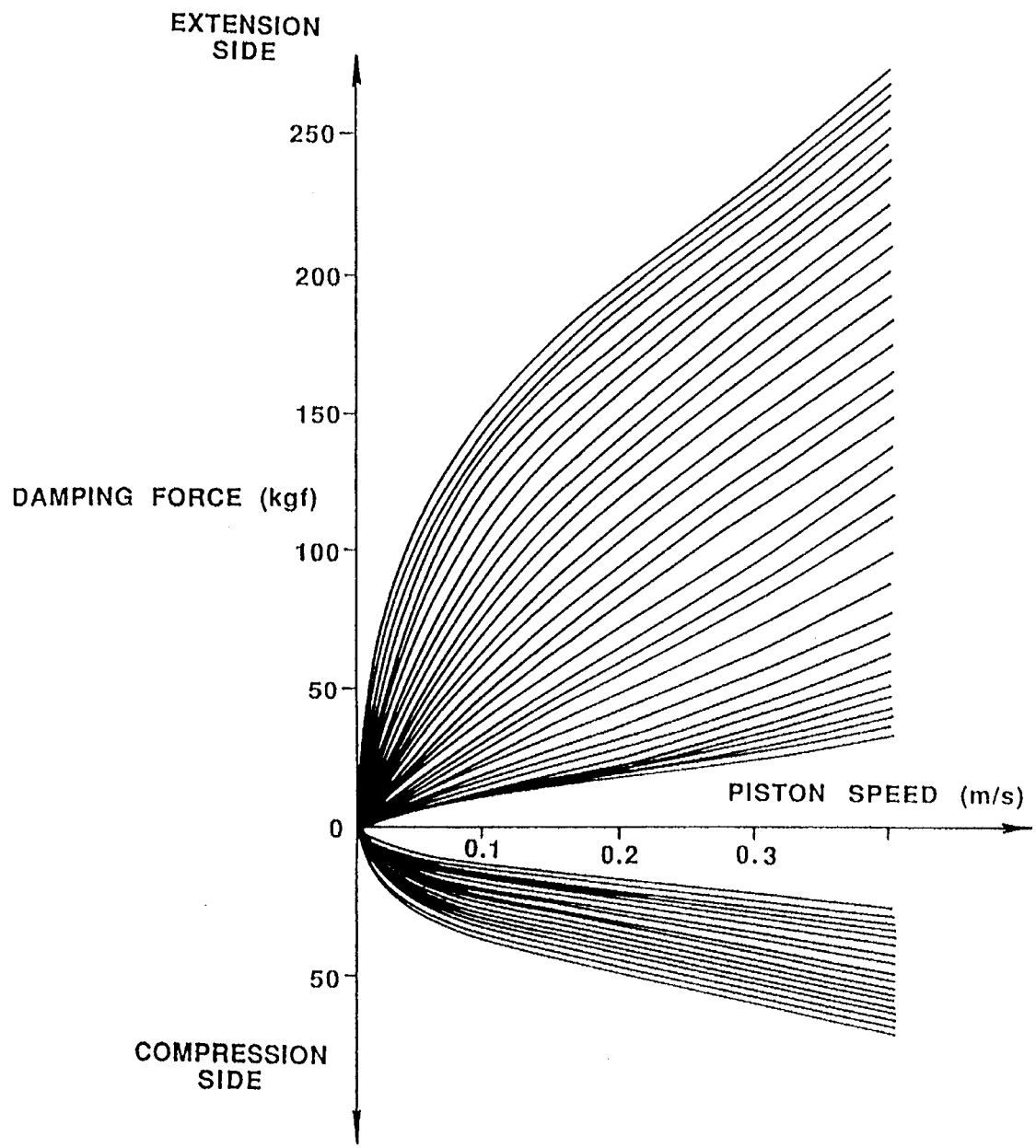
FIG. 6 is a graph which shows a relation between piston speed and damping force of a shock absorber.

With the above arrangements, rotation of the adjusting pin 40 causes a damping coefficient of the shock absorber SA to vary at multiple stages, as shown in FIG. 6, within a range from the lowest damping coefficient (hereinafter, referred to as a soft damping position) to the highest damping coefficient (hereinafter, referred to as a hard damping position) during bounding and rebounding strokes.

Figure 7:
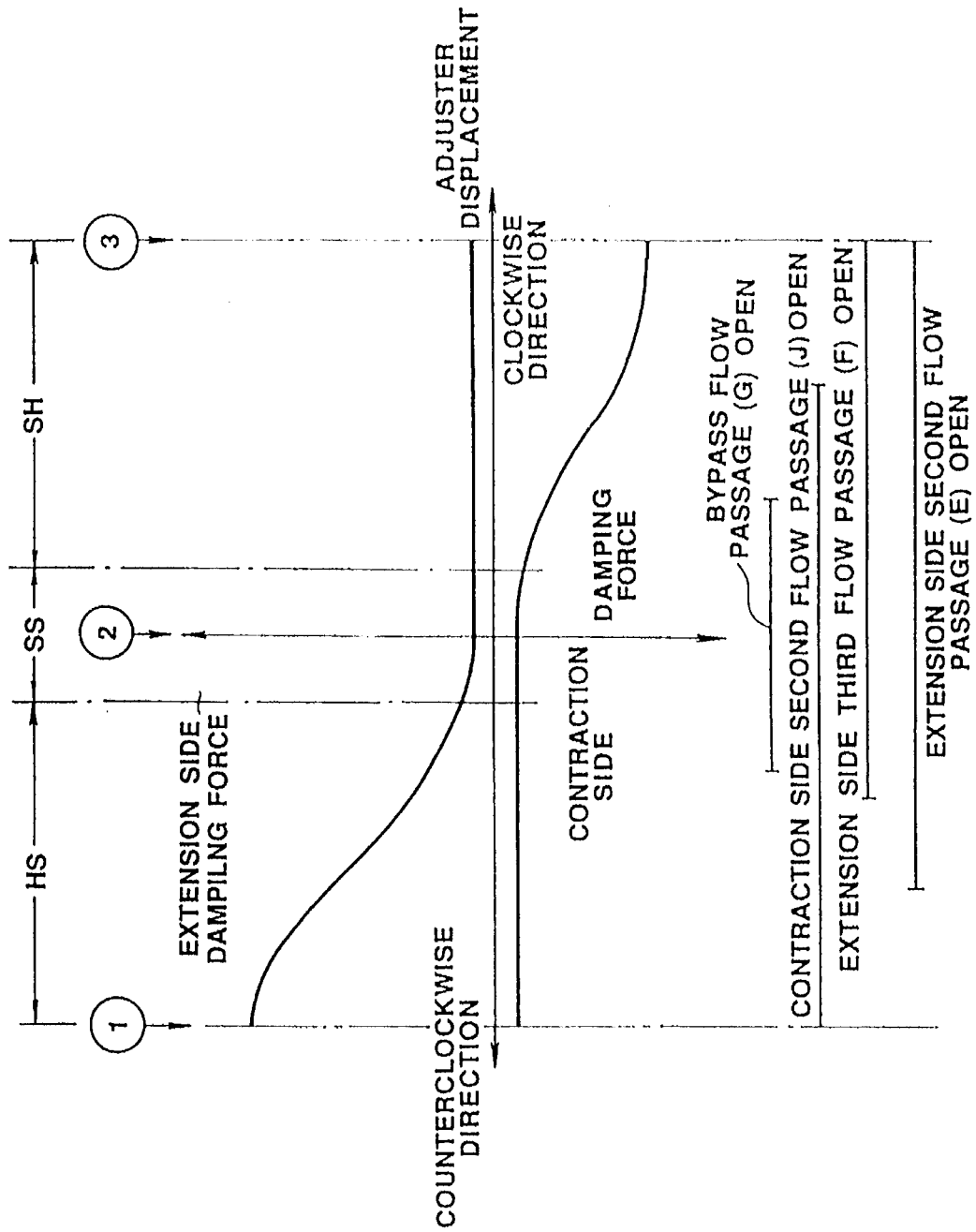
FIG. 7 is a graph which shows a relation between an angular position of an adjusting pin and damping force of a shock absorber.
Figure 8A:
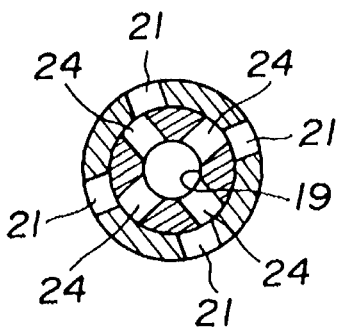
FIG. 8(a) is a cross-sectional view taken along the line K—K in FIG. 5 which shows an adjusting pin at a position ① in FIG. 7.
Figure 8B:
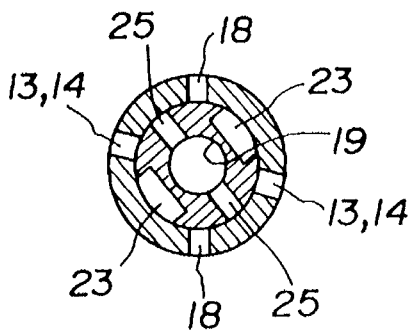
FIG. 8(b) is a cross-sectional view taken along the line M— M in FIG. 5 which shows an adjusting pin at a position ① in FIG. 7.
Figure 8C:
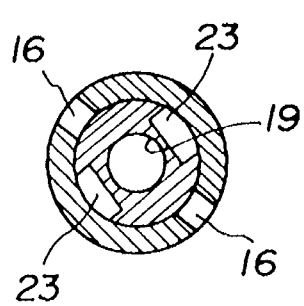
FIG. 8(c) is a cross-sectional view taken along the line N—N in FIG. 5 which shows an adjusting pin at a position ① in FIG. 7.
Figure 9A:
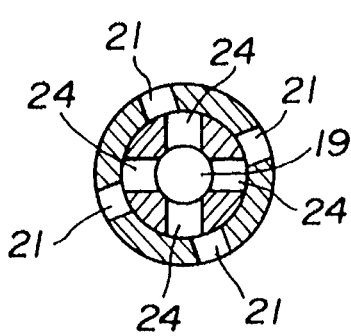
FIG. 9(a) is a cross-sectional view taken along the line K—K in FIG. 5 which shows an adjusting pin at a position ② in FIG. 7.
Figure 9B:
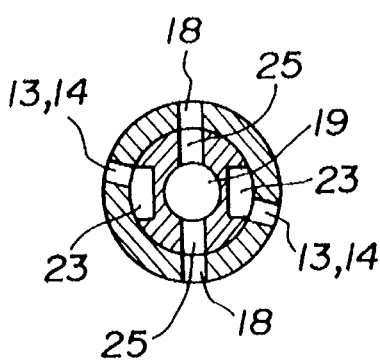
FIG. 9(b) is a cross-sectional view taken along the line M—M in FIG. 5 which shows an adjusting pin at a position ② in FIG. 7.
Figure 9C:
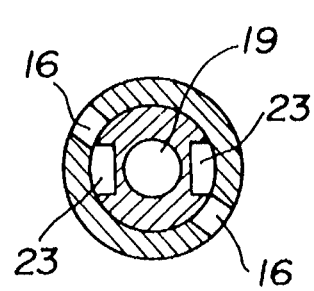
FIG. 9(c) is a cross-sectional view taken along the line N—N in FIG. 5 which shows an adjusting pin at a position ② in FIG. 7.
Figure 10A:
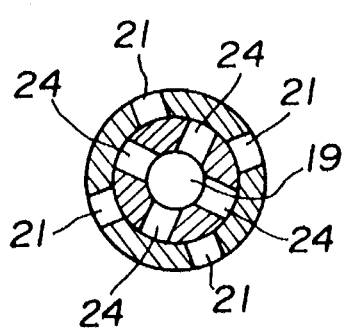
FIG. 10(a) is a cross-sectional view taken along the line K—K in FIG. 5 which shows an adjusting pin at a position ③ in FIG. 7.
Figure 10B:
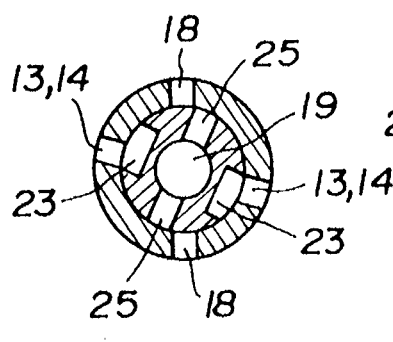
FIG. 10(b) is a cross-sectional view taken along the line M—M in FIG. 5 which shows an adjusting pin at a position ③ in FIG. 7.
Figure 10C:
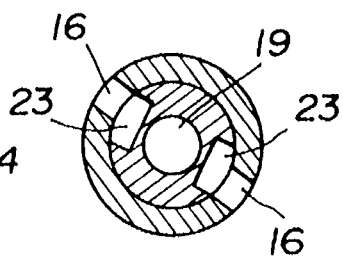
FIG. 10(c) is a cross-sectional view taken along the line N—N in FIG. 5 which shows an adjusting pin at a position ③ in FIG. 7.

Referring to FIG. 7, a relation between a position of the adjusting pin 40 and damping force characteristics of the shock absorber SA is shown. When the adjusting pin 40 is rotated in a counterclockwise direction from the position ② (in a softer damping range SS wherein the lowest damping coefficients are established during both bounding and rebounding strokes) to the position ①, the damping coefficient is increased toward the hard damping position (in a rebounding harder damping range HS) only in the rebounding stroke (i.e., during extension). Alternatively, rotating the adjusting pin 40 in a clockwise direction to the position ③ causes the damping coefficient to change toward the hard damping position (in a bounding harder damping range SH) only in the bounding stroke (i.e., during compression) without any change in the rebounding stroke.

It will be noted that, in FIG. 7, when the adjusting pin 40 is rotated and halted at the three positions ①, ②, and ③, the cross-sectional situations of the adjusting pin taken along the line K—K, along the line M—M, and along the line N—N are shown in FIGS. 8(A), 9(A), and 10(A), FIGS. 8(B), 9(B), and 10(B), and FIGS. 8(C), 9(C), and 10(C) respectively.

Figure 11:
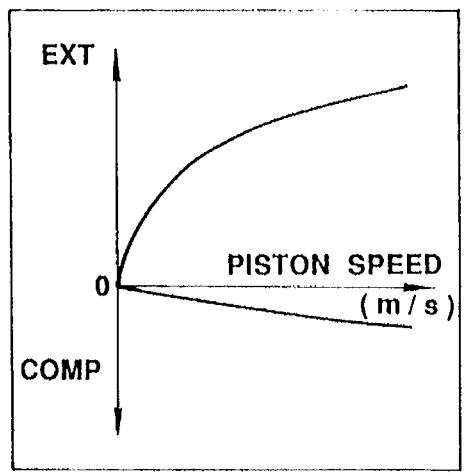
FIGS. 11, 12, and 13 are graphs which show relations between piston speed and damping force when an adjusting pin is arranged at positions ①, ②, and ③ in FIG. 7 respectively.
Figure 12:
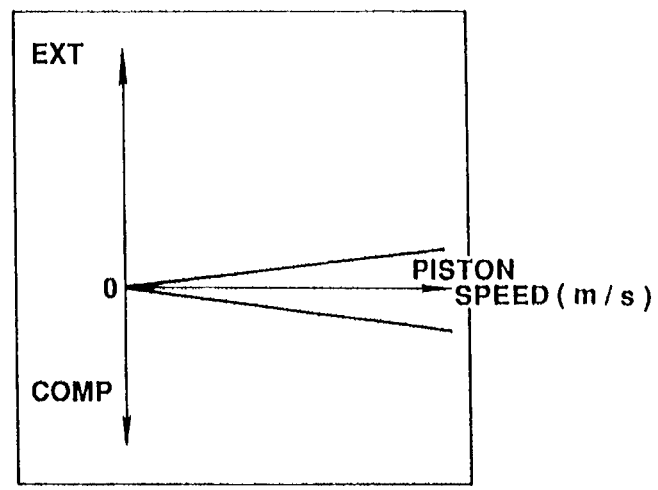
Figure 13:
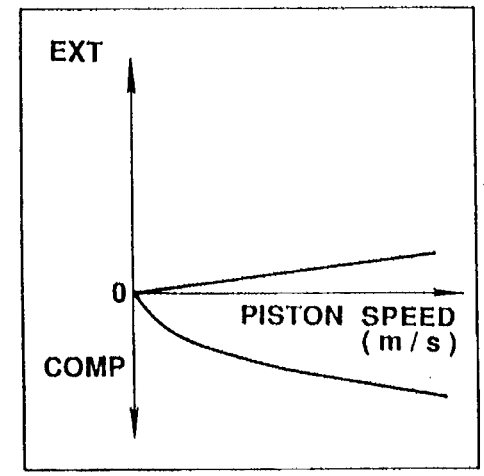

In addition, the damping force characteristics at the positions ①, ②, and ③ of the adjusting pin 40 are shown in FIGS. 11, 12, and 13.

Figure 14:
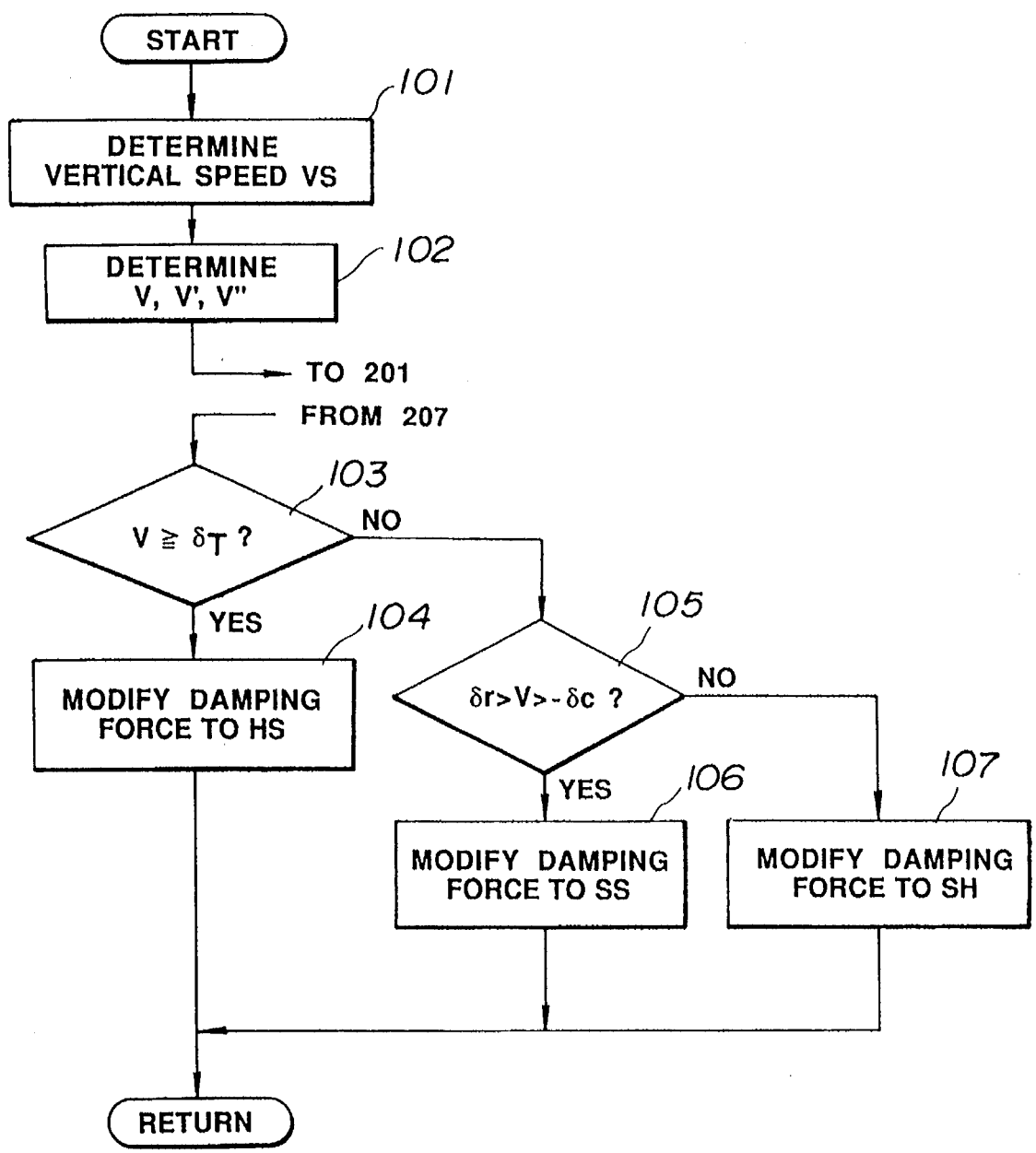
FIGS. 14 and 15 are flowcharts which show logical steps performed by a control unit of a suspension control system.
Figure 15:
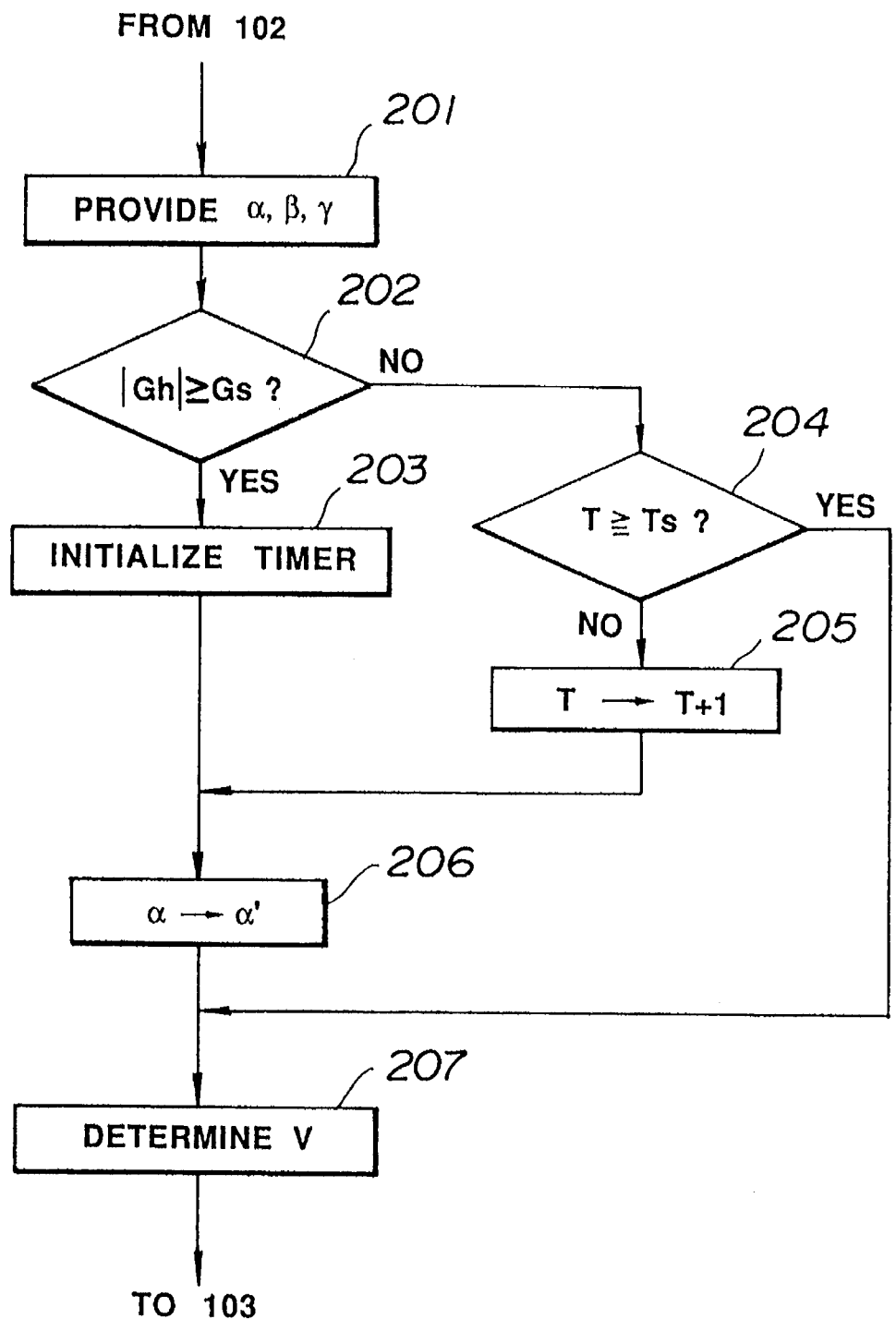

Referring to FIGS. 14 and 15, there is shown a flowchart of a program or sequence of the logical steps performed by the control unit 4 for controlling the operation of the pulse motor 3 for modifying damping force characteristics of the shock absorber SA. The damping force characteristic modification control, as discussed below, is carried out for every shock absorber SA.

After entering the program, the routine proceeds to step 101 wherein the control unit 4 monitors vertical acceleration $G_h$ acting on a portion of the vehicle body adjacent a road wheel based on a signal from the vertical G sensor 1 to determine vertical speed VS. The routine then proceeds to step 102 wherein the bouncing, pitching, and rolling motion components v, v', and v" are provided by the filters LPF1, LPF2, BPF1, BPF2, and BPF3 based on the vertical speed. Afterward, the routine proceeds to a subprogram, as shown in FIG. 15, for determining control signal values $V_1$, $V_2$, $V_3$, and $V_4$ for the shock absorbers $SA_1$, $SA_2$, $SA_3$, and $SA_4$ respectively. The control signal values will be represented by the reference symbol "V" as generally referred to.

In step 201, proportional constants, or bouncing, pitching, and rolling control gains α, β, and γ are provided for determining damping coefficients against bouncing, pitching, and rolling motions. The routine then proceeds to step 202 wherein it is determined whether an absolute value $|G_h|$ of the vertical acceleration $G_h$ is greater than or equal to a preselected threshold value $G_s$ or not. If a YES answer is obtained ($|G_h| \geq G_s$), the routine then proceeds to step 203 wherein a count value T in a timer is cleared, or initialized to zero. Alternatively, if a NO answer is obtained in step 202 concluding that the absolute value $|G_h|$ is less than the preselected threshold value $G_s$, the routine then proceeds to step 204 wherein it is determined whether the count value T in the timer is greater than or equal to a preselected control delay time value $T_s$ or not. If a YES answer is obtained concluding that the count value T of the timer is greater than or equal to the control delay time value $T_s$, the routine then proceeds to step 207 directly. Alternatively, if a NO answer is obtained in step 204, the routine then proceeds 205 wherein one is added to the count value T of the timer. The routine then proceeds to step 206 wherein the bouncing control gain α is modified to a preselected smaller bouncing control gain α'. Afterward, the routine proceeds to step 207.

In step 207, the control signal value V is determined based on the bouncing, pitching, and rolling motion components v, v', and v" according to the following equations.

$$V_1 = \alpha_{fr}/4 \cdot (V_1 + V_2 + V_3 + V_4) + \beta_{fr}(V'_1 - V'_3) + \gamma_{fr}(V''_1 - V''_2)$$

$$V_2 = \alpha_{fl}/4 \cdot (V_1 + V_2 + V_3 + V_4) + \beta_{fl}(V'_1 - V'_4) + \gamma_{fl}(V''_2 - V''_1)$$

$$V_3 = \alpha_{rr}/4 \cdot (V_1 + V_2 + V_3 + V_4) + \beta_{rr}(V'_3 - V'_1) + \gamma_{rr}(V''_3 - V''_4)$$

$$V_4 = \alpha_{rl}/4 \cdot \underbrace{(V_1 + V_2 + V_3 + V_4)}_{\text{bouncing rate}} + \underbrace{\beta_{rl}(V'_4 - V'_2)}_{\text{pitching rate}} + \underbrace{\gamma_{rl}(V''_4 - V''_3)}_{\text{rolling rate}}$$

$$\quad\quad\quad\quad\quad\quad\quad (A) \quad\quad\quad (B) \quad\quad\quad (C)$$

where $V_1$: control signal value for the front-right shock absorber $SA_1$ $V_2$: control signal value for the front-left shock absorber $SA_2$ $V_3$: control signal value for the rear-right shock absorber $SA_3$ $V_4$: control signal value for the rear-left shock absorber $SA_4$ $\alpha_{fr}, \beta_{fr}, \gamma_{fr}$: control gains for the shock absorber $V_1$ $\alpha_{fl}, \beta_{fl}, \gamma_{fl}$: control gains for the shock absorber $V_2$ $\alpha_{rr}, \beta_{rr}, \gamma_{rr}$: control gains for the shock absorber $V_3$ $\alpha_{rl}, \beta_{rl}, \gamma_{rl}$: control gains for the shock absorber $V_4$ $v_1, v'_1, v''_1$: bouncing, pitching, and rolling motion components at a front-right vehicle body portion $v_2, v'_2, v''_2$: bouncing, pitching, and rolling motion components at a front-left vehicle body portion $v_3, v'_3, v''_3$: bouncing, pitching, and rolling motion components at a rear-right vehicle body portion $v_4, v'_4, v''_4$: bouncing, pitching, and rolling motion components at a rear-left vehicle body portion It will be noted that in the above equations, the first terms (A) represent bouncing motion damping coefficients, the second terms (B) represent pitching motion damping coefficients, and the third terms (C) represent rolling motion damping coefficients. Additionally, the pitching and rolling rates are determined based on differences between front and rear vertical speeds and between right and left vertical speeds respectively. However, these may be determined based on detected values of longitudinal and lateral acceleration sensors such as a gyro-sensor.

Figure 16:
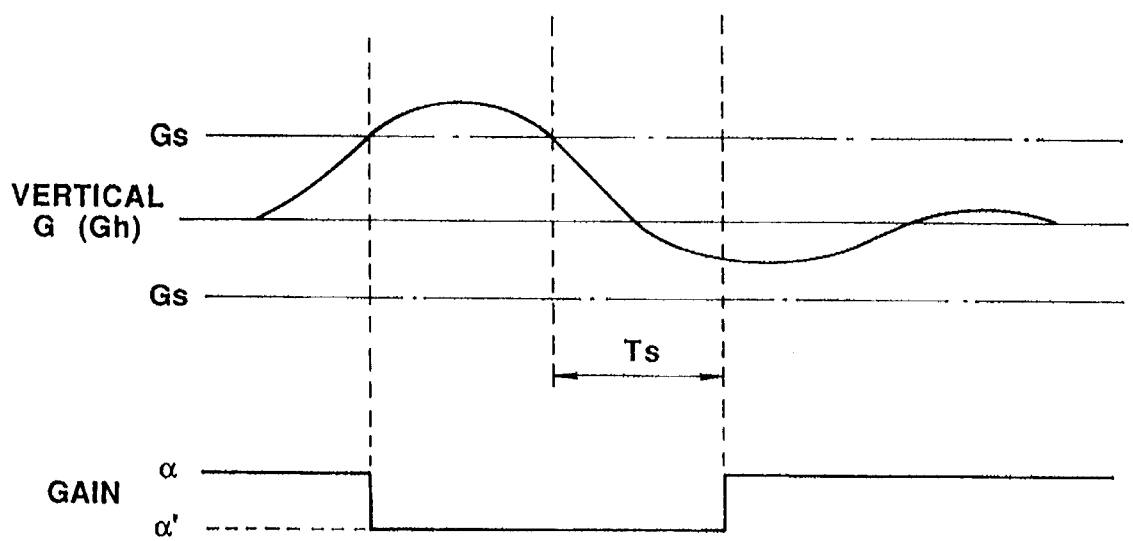
FIG. 16 is a time-chart which shows operation of damping coefficient modification for suppressing bouncing motion which is performed in a subroutine as shown in FIG. 15.

Referring to FIG. 16, a time-chart is shown which represents the operation of the subroutine (steps 201 to 207).

The time-chart shows that when the absolute so value $|G_h|$ of the vertical acceleration $G_h$ exceeds the preselected threshold value $G_s$, the bouncing control gain α ($\alpha_{fr}, \alpha_{fl}, \alpha_{rr}, \alpha_{rl}$) is modified to the bouncing control gain α' which is smaller than the α by a preselected value for providing smaller bouncing motion damping coefficient of the shock absorber SA. After the preselected control delay time $T_s$ elapsed by the timer following decrease in the absolute value $|G_h|$ below the threshold value $G_s$, the greater bouncing control gain α is provided again.

Referring back to FIGS. 14 and 15, after step 207, the routine proceeds to step 103 wherein it is determined whether the control signal value V determined in step 207 is greater than or equal to a preselected threshold value $\delta_T$. If a YES answer is obtained ($V \geq \delta_T$), the routine then proceeds to step 104 wherein the shock absorber SA is controlled to assume damping force characteristics in the rebounding harder damping range HS as shown in FIG. 7. Alternatively, if a NO answer is obtained in step 103 concluding that the control signal value V is less than the preselected threshold value $\delta_T$, the routine then proceeds to step 105 wherein it is determined whether the control signal value V is greater than a threshold value $-\delta_C$ or not. If a YES answer is obtained, the routine then proceeds to step 106 wherein the shock absorber SA is controlled to assume the damping force characteristics in the softer damping range SS. Alternatively, if a NO answer is obtained in step 105 concluding that the value of the control signal V is less than the threshold value $-\delta_C$, the routine then proceeds to step 107 wherein the damping force characteristics are modified be in the bounding harder damping range SH.

Figure 17:
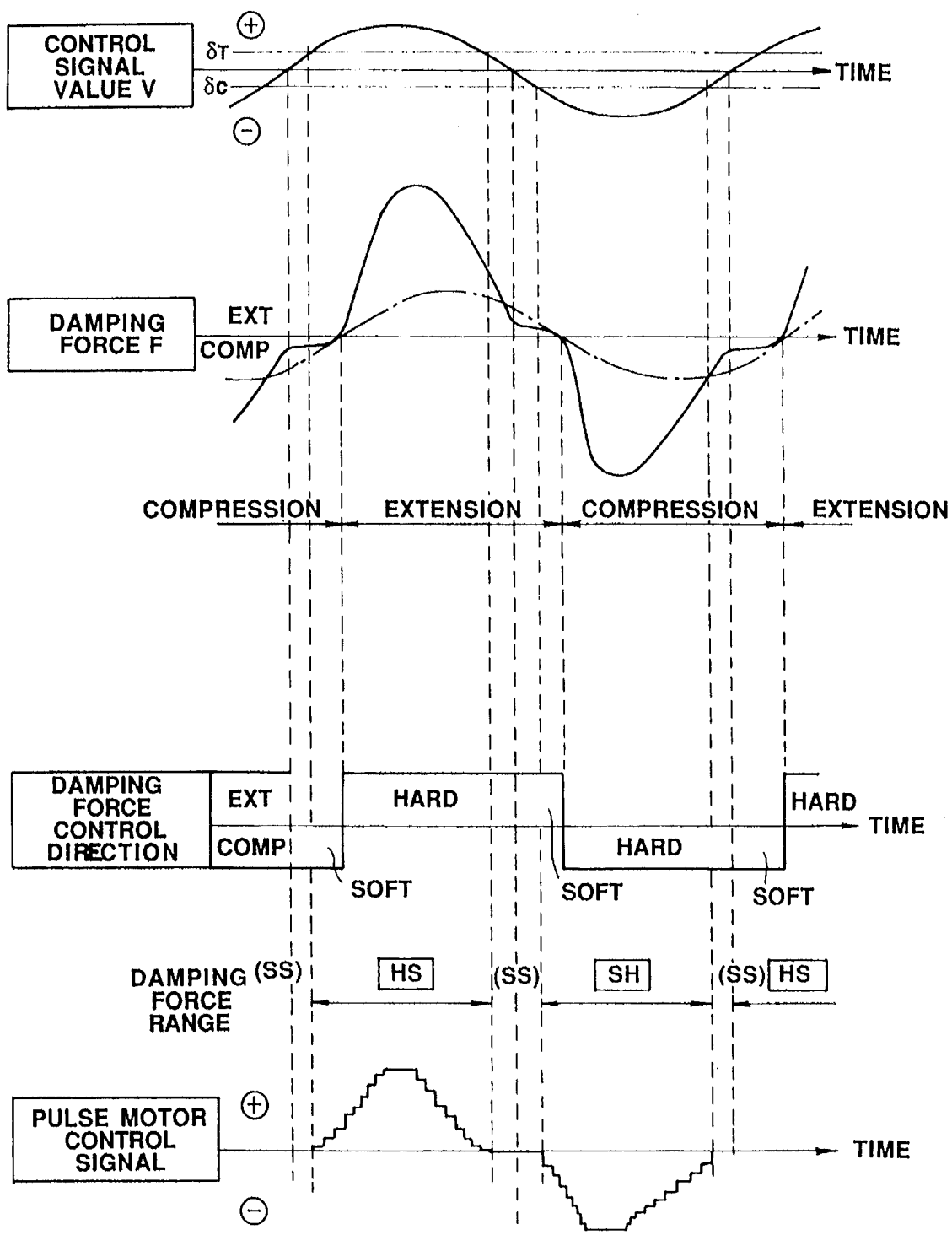
FIG. 17 is a time-chart which shows operation of damping coefficient control performed by a suspension control system for suppressing vehicle attitude change.

Referring to FIG. 17, there is shown a time-chart which represents the operation of the suspension control system.

Assuming that the control signal value V varies according to a sine curve caused by variation in vertical speed of a vehicle body, when the control signal value V falls in a range between the threshold values $\delta_T$ and $-\delta_C$, the shock absorber SA assumes damping force characteristics in the softer damping range SS.

When the control signal value V becomes greater than the threshold value $\delta_T$, the shock absorber SA is controlled to assume the damping force characteristics in the rebounding harder damping range HS wherein a damping coefficient C is increased in proportion to the control signal value V (C=k·V) only in the rebounding stroke while maintaining the lower damping coefficient in the bounding stroke.

When the control signal value V becomes less than the threshold value $-\delta_C$, the shock absorber SA is controlled to exhibit the damping force characteristics in the bounding harder damping range SH wherein the damping coefficient C is increased in proportion to the control signal value V (C=k·V) only in the bounding stroke while maintaining the lower damping coefficient in the rebounding stroke.

With the above damping coefficient modification, when the vertical acceleration is greater than the preselected threshold value $G_S$, that is, when bouncing motion becomes greater than a preselected degree, the bouncing control gain α is modified to the smaller value α' while maintaining the pitching and rolling control gains at preselected constant values respectively. Thus, a lower damping force is provided against the great bouncing motion due to high frequency vibration input from a road surface for assuring passenger comfort, while a higher damping force is provided against rolling and pitching motions to suppress vehicle attitude change caused thereby sufficiently for securing driving stability. Additionally, in the above embodiment, the bouncing control gain is changed between the two values α and α' different from each other, however, more than two different gains may be provided dependent upon a degree of bouncing motion.

In the above equations for determining the control signal values $V_1, V_2, V_3, V_4$, the bouncing rates are determined based on an average value of the bouncing motion components, or vertical speeds $v_1, v_2, v_3$, and $v_4$. This average value of the bouncing motion components, therefore, tends to include a portion of components of pitching and/or rolling motions. Accordingly, for eliminating the components of the pitching and rolling motions completely from the bouncing motion component, the control signal values V may be derived according to the following mathematical relations. However, in this case, vibration attenuation against the pitching and rolling motions is somewhat reduced by a degree of the elimination of the pitching and rolling motion components from the bouncing motion components.

$$V_1 = \alpha_{fr} \cdot V_1 + \beta_{fr}(V'_1 - V'_3) + \gamma_{fr}(V''_1 - V''_2)$$

$$V_2 = \alpha_{fl} \cdot V_2 + \beta_{fl}(V'_1 - V'_4) + \gamma_{fl}(V''_2 - V''_1)$$

$$V_3 = \alpha_{rr} \cdot V_3 + \beta_{rr}(V'_3 - V'_1) + \gamma_{rr}(V''_3 - V''_4)$$

$$V_4 = \alpha_{rl} \cdot V_4 + \beta_{rl}(V'_4 - V'_2) + \gamma_{rl}(V''_4 - V''_3)$$

Figure 18:
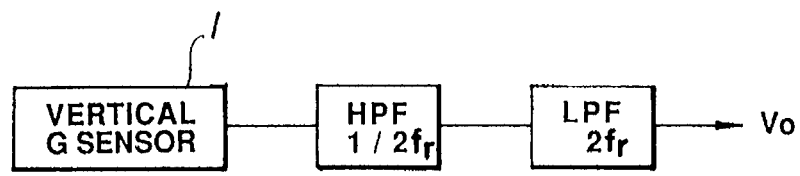
FIG. 18 is a block diagram which shows an alternative embodiment of a filter circuit incorporated in a control unit of a suspension control system.

Referring to FIG. 18, there is shown an alternate embodiment of the filter circuit 4d incorporated in the interface circuit 4a of the control unit 4. The filter circuit 4d of this embodiment includes a high-pass filter HPF and a low-pass filter LPF. The high-pass filter HPF is operable to cut off given frequencies which are one-half unsprung resonance frequencies included in the sprung vertical acceleration monitored by the vertical G sensor 1. The low-pass filter LPF serves to cut off given frequencies which are twice unsprung resonance frequencies included in the vertical acceleration monitored by the vertical G sensor 1. With the activities of the filters HPF and LPF, only a component $v_0$ of frequency within a range of unsprung resonance frequency is derived from the vertical acceleration signal of the vertical G sensor 1. The component $v_0$ causes bouncing motion of a vehicle body to generate.

Figure 19:
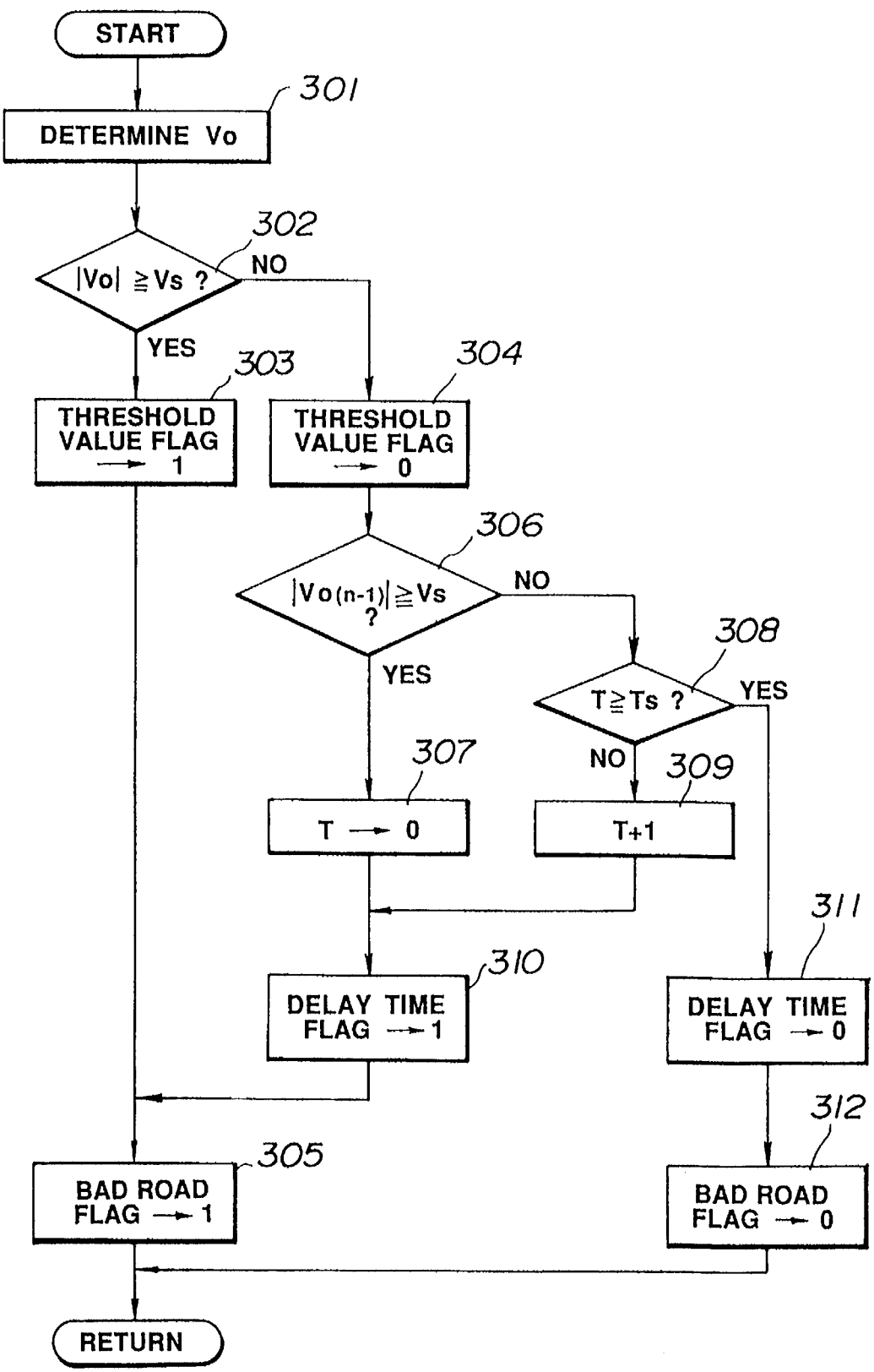
FIG. 19 is a flowchart which shows a program of logical steps of an alternative embodiment for determining road conditions in damping coefficient modification against bouncing motion of a vehicle body.

Referring to FIG. 19, a flowchart of an alternate program or sequence of logical steps performed by the control unit 4 utilizing the filter circuit 4d as shown in FIG. 19.

After entering the program, the routine proceeds to step 301 wherein the filter circuit 4d provides the unsprung resonance frequency component $v_0$. The routine then proceeds to step 302 wherein it is determined whether an absolute value of the component $v_0$ is greater than or equal to a preselected threshold value $v_s$ or not. If a YES answer is obtained ($|v_0| \geq v_s$), the routine then proceeds to step 303 wherein a threshold value flag is set to one. Afterward, the routine proceeds directly to step 305 wherein a bad road flag is set to one.

Alternatively, if a NO answer is obtained in step 302 concluding that the absolute value of the unsprung resonance frequency component $v_0$ is less than the preselected threshold value $v_s$, the routine proceeds to step 304 wherein the threshold value flag is set to zero. The routine then proceeds to step 306 wherein it is determined whether an absolute value of a component $v_{0(n-1)}$ one program cycle before is greater than or equal to the preselected threshold value $v_s$ or not. If a YES answer is obtained ($|v_{0(n-1)}| \geq v_s$), the routine then proceeds to step 307 wherein a count value T of the timer is initialized to zero. Afterward, the routine proceeds to step 310.

If a NO answer is obtained in step 306 concluding that the absolute value of the previous unsprung resonance frequency component $v_{0(n-1)}$ is less than the preselected threshold value $v_s$, the routine then proceeds to step 308 wherein it is determined whether the count value T of the timer is greater than a preselected threshold value, or control delay time value $T_s$ or not. If a NO answer is obtained concluding that the control delay time has not been elapsed, the routine then proceeds to step 309 wherein one is added to the count value T of the timer. The routine then proceeds to step 310 wherein a delay time flag is set to one. Alternatively, if a YES answer is obtained in step 308 concluding that the control delay time has been elapsed, the routine then proceeds to step 311 wherein the delay time flag is set to zero. The routine then proceeds to step 312 wherein the bad road flag is set to zero. Afterward, the routine is then returned to the initial step.

Figure 20:
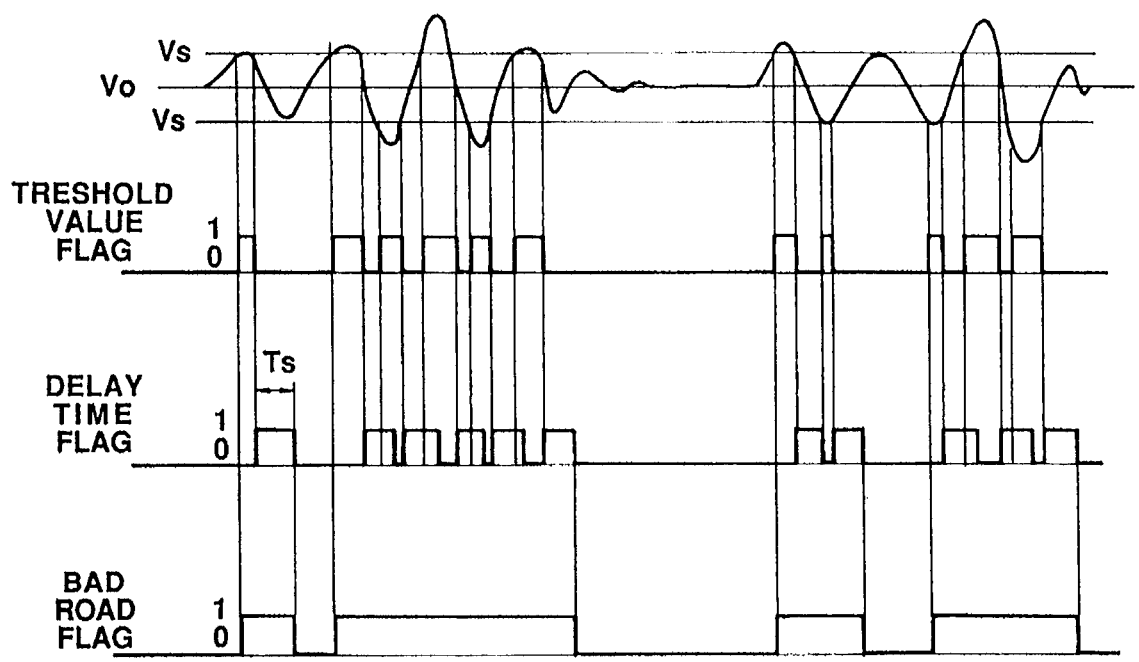
FIG. 20 is a time-chart which shows operation of logical steps as shown in FIG. 19.

It will be appreciated that the bad road flag of one is, as shown in FIG. 20, obtained when at least one of the threshold value flag or the delay time flag indicates one, concluding that a vehicle is traveling on an uneven road surface.

Figure 21:
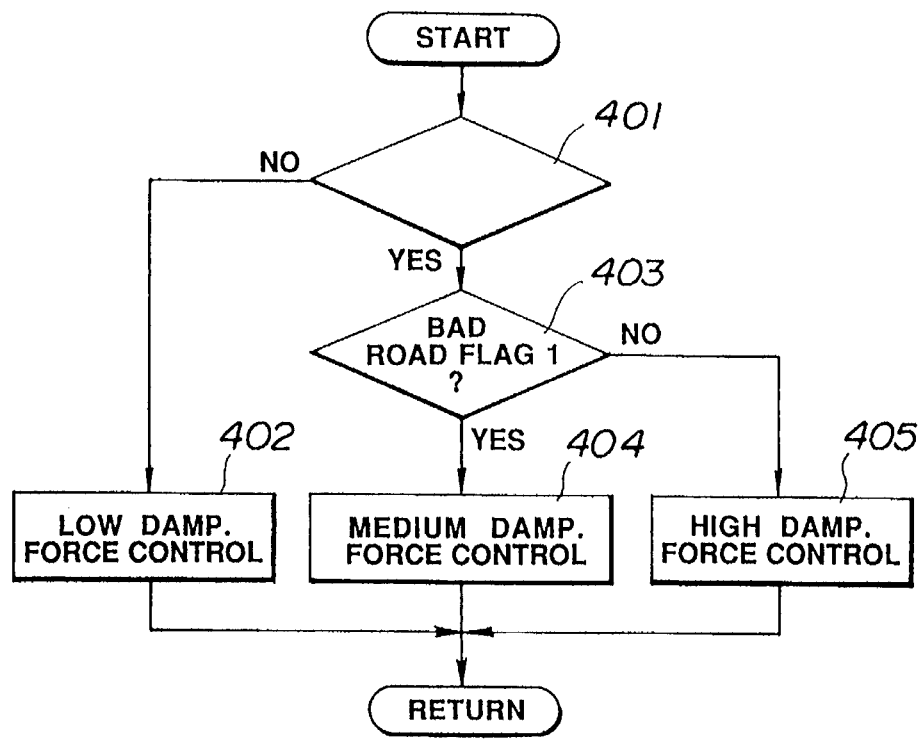
FIG. 21 is a flowchart which shows an alternative program of logical steps performed by a control unit of a suspension control system.

Referring to FIG. 21, there is shown a flowchart of a flowchart of a program or sequence of logical steps for controlling damping coefficients of the shock absorbers SA respectively.

After entering the program, the routine proceeds to step 401 wherein it is determined whether the product of the vertical speed VS and relative speed VR between a vehicle body and a wheel determined based on a signal from the load sensor 6 is greater than or equal to zero or not (VS·VR≧0?). Note that the vertical speed in an upward direction is a positive value, while in a downward direction it is a negative value, the relative speed in an extension stroke of the shock absorber is a positive value, while in a compression stroke it is a negative value.

If a NO answer is obtained in step 401 concluding that signs of values of the vertical speed VS and the relative speed VR are different from each other, that is, that the vertical speed VS and the relative speed VR are in opposite directions of a stroke of the shock absorber SA, the routine then proceeds to step 402 wherein the shock absorber SA is controlled to assume damping force characteristics in the range of the softer damping range SS as shown in FIG. 7. Alternatively, if a YES answer is obtained in step 401 concluding that the signs of the vertical speed VS and the relative speed VR are the same, that is, that the vertical speed VS and the relative speed VR are in the same direction of a stroke of the shock absorber SA, the routine then proceeds to step 403 wherein it is determined whether the bad road flag is one or not. If a YES answer is obtained concluding that road conditions are relatively bad, the routine then proceeds to step 404 wherein the damping force characteristics are modified to be in the rebounding harder damping range HS or the bounding harder damping range SH so that a preselected intermediate damping coefficient is provided during a stroke of the shock absorber SA in the same direction as the sprung vertical speed VR, while the minimum or lowest damping coefficient is provided during the opposite stroke.

If a NO answer is obtained in step 403 concluding that the road conditions are relatively good, the routine then proceeds to step 405 wherein the shock absorber SA is controlled to exhibit the damping force characteristics in the rebounding harder damping ranges HS or the bounding harder damping range SH so that the highest damping coefficient which is proportional to the sprung vertical speed VS is provided during a stroke of the shock absorber SA in the same direction as the sprung vertical speed VS, while the lowest damping coefficient is provided during the opposite stroke.

Figure 22:
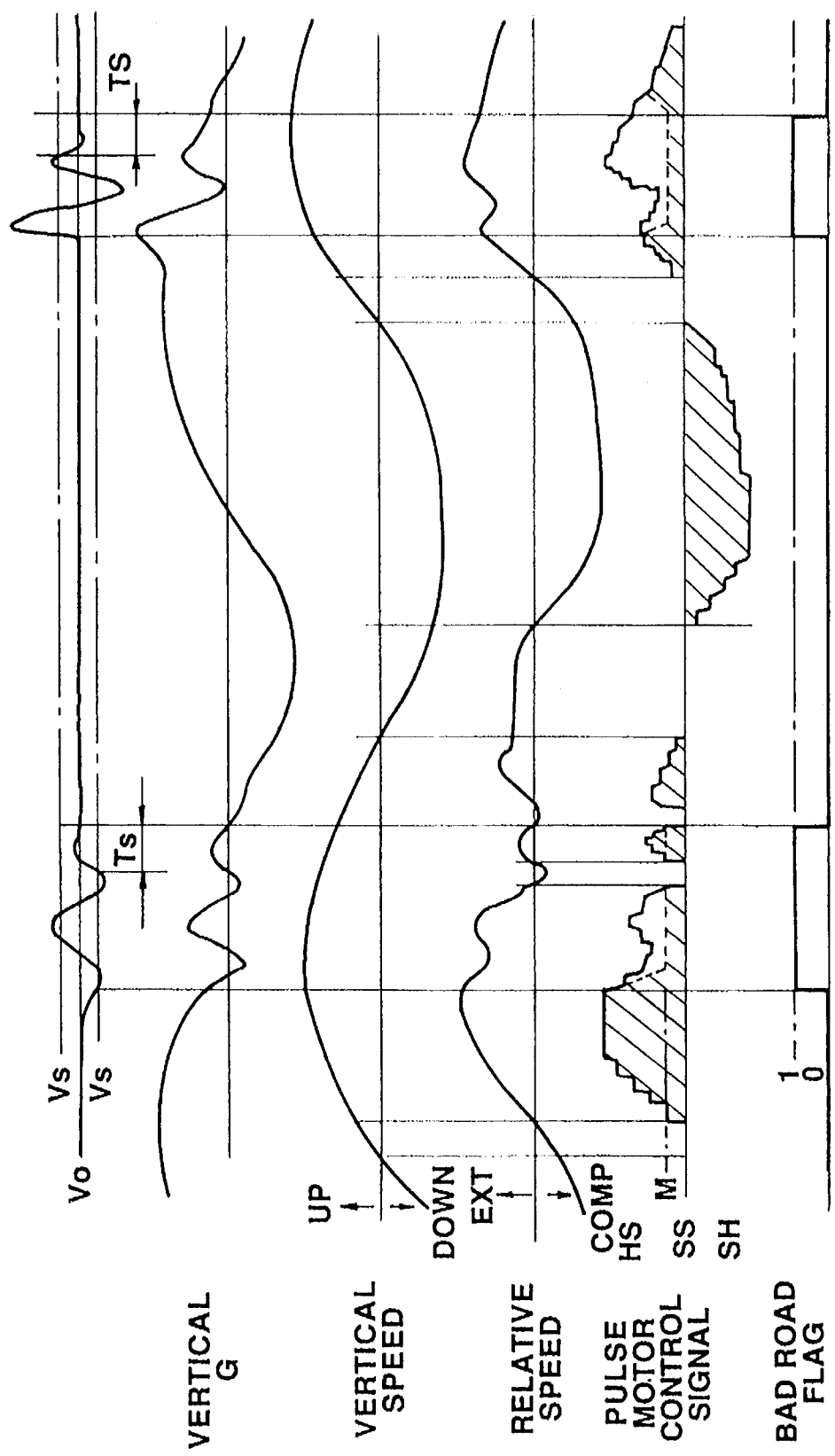
FIG. 22 is a time-chart which shows operation of damping coefficient control performed by an alternative embodiment of a suspension control system.

Referring to FIG. 22, there is shown a time-chart which represents damping force modification control for the shock absorber SA.

When a vehicle is traveling on an even road surface, or under good road conditions, a value of the vertical acceleration in a range of unsprung resonance frequency, or bouncing motion becomes small so that an absolute value of the unsprung resonance frequency component $v_0$ is less than the threshold value $v_s$. Therefore, when values of the sprung vertical speed VS and the relative speed VR represent the same sign, or the damping force acts in a direction of vibration attenuation, the highest damping coefficient is provided during a stroke in the same direction as the sprung vertical speed VS. Alternatively, when the values of the sprung vertical speed VS and the relative speed VR represent a sign different from each other, damping force of the lowest the damping coefficient is provided in a direction of vibration input so that vehicle body vibration due to low frequency input from a road surface is attenuated for securing driving stability.

When the vehicle is traveling on an uneven road, the value of the vertical acceleration in the range of unsprung resonance frequency, or the bouncing motion, becomes great so that the unsprung resonance frequency component $v_0$ exceeds the threshold value $v_s$. The damping force of the preselected intermediate damping coefficient is provided during a stroke in the same direction as the sprung vertical speed v until the preselected control delay time $(T_s)$ is elapsed after an absolute value of the unsprung resonance frequency component $v_0$ becomes below the threshold value $v_s$ even when the sprung vertical speed VS and the relative speed VR represent the same sign. Therefore, vehicle riding comfort is improved when high frequency vibrations are input to the vehicle body.

Figure 23:
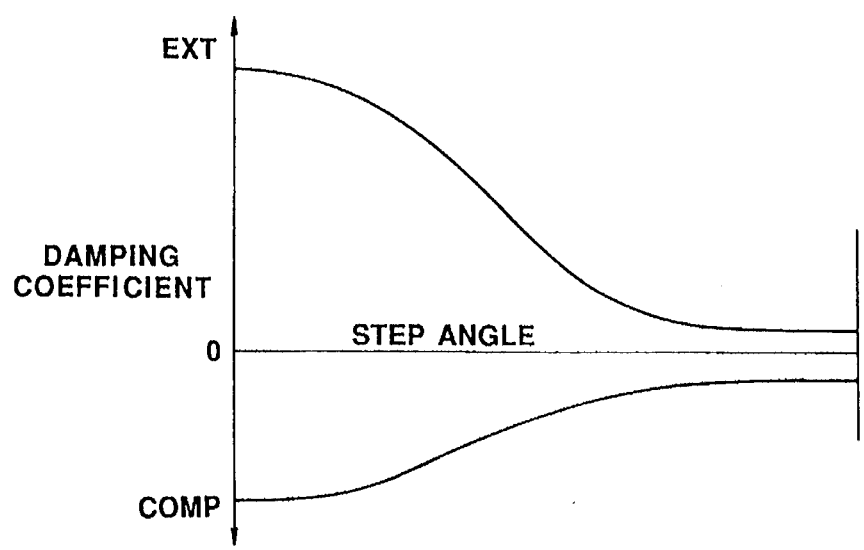
FIG. 23 is a graph which shows damping coefficient modification of a shock absorber of a third embodiment.

Referring to FIG. 23, there is shown an alternative embodiment of the shock absorber SA. This shock absorber SA is adapted for variably controlling damping force characteristics so that damping coefficients in bounding and rebounding strokes are varied simultaneously within a range between preselected higher and lower values according to a step angle of the pulse motor 3. This type of shock absorber is disclosed in Japanese Utility Model First Publication No. 63-112914, the disclosure of which is incorporated herein by reference.

Figure 24:
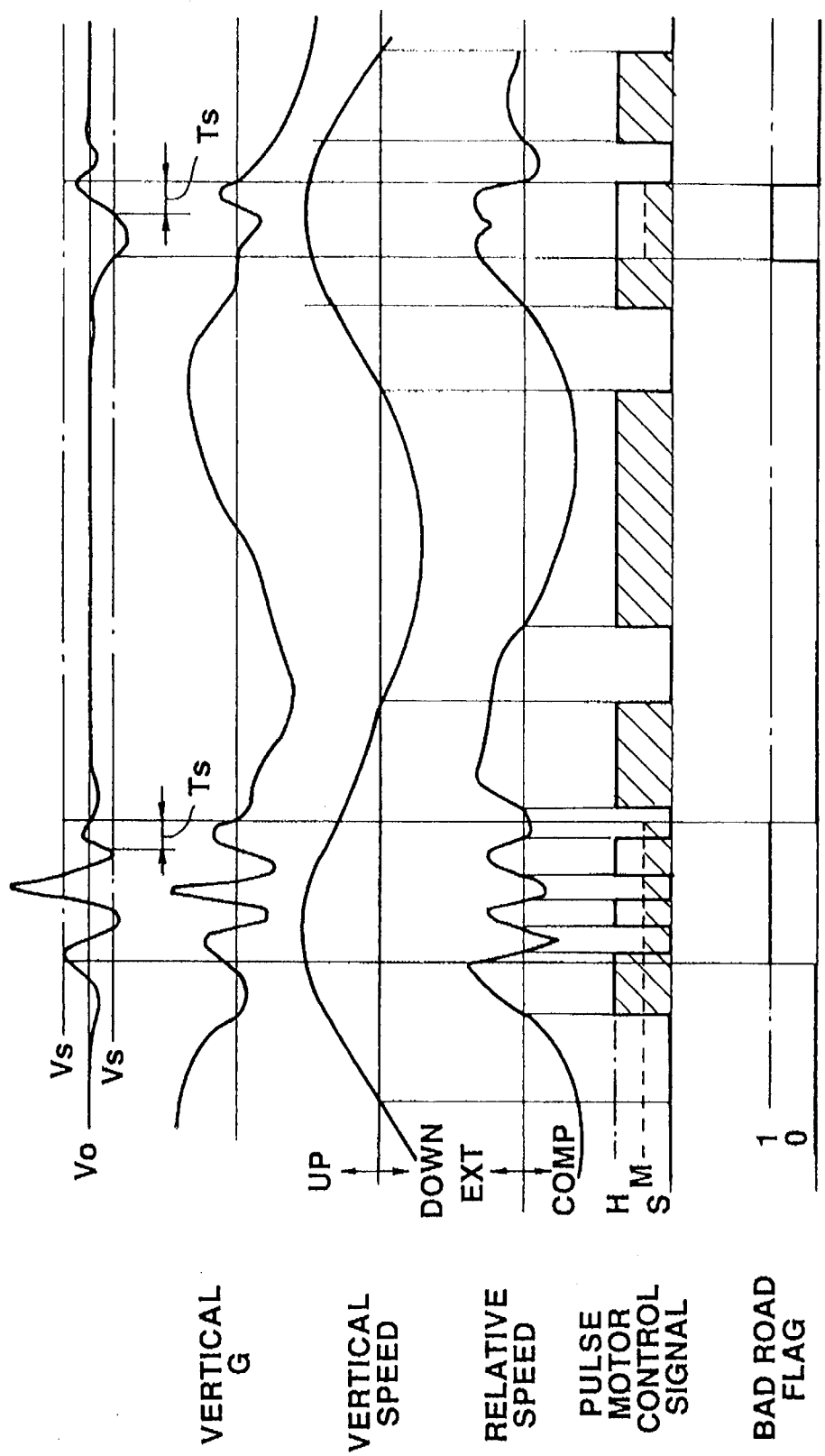
FIG. 24 is a time-chart which shows operation of damping coefficient control performed by a third embodiment of a suspension control system.

Referring to FIG. 24, there is shown a time-chart which represents damping force modification control for the above alternative embodiment. The damping coefficients of the shock absorber SA in bouncing and rebounding strokes are, as shown in the time-chart, modified over a range of a higher damping coefficient H, an intermediate damping coefficient M, and a lower damping coefficient S.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims. For example, while in the above embodiment, the intermediate damping coefficient is provided under the bad road conditions, It may be set to the lowest damping coefficient. Additionally, in the filter circuit 4d, the low-pass filter LPF may be omitted.

What is claimed is:

1. A suspension control system for an automotive vehicle comprising:

shock absorbers disposed between a vehicle body and suspension members rotatably supporting wheels respectively, each shock absorber being stepwise adjustable between higher and lower damping coefficients in response to a control signal;

vertical acceleration sensor means for determining a vertical acceleration of a sprung mass of the vehicle to provide a signal indicative thereof; and control means responsive to the signal from said vertical acceleration sensor means for providing to said shock absorbers a first control signal for modifying the damping force characteristics of said shock absorbers and making said shock absorbers assume a first damping coefficient against bouncing motion of the vehicle body when the vertical acceleration of the sprung mass of the vehicle is smaller than a preselected threshold value and a second control signal for modifying the damping force characteristics of said shock absorbers and making said shock absorbers assume a second damping coefficient, which is smaller than the first damping coefficient in a direction of the lower damping coefficient, against the bouncing motion when the vertical acceleration of the sprung mass of the vehicle is greater than the preselected threshold value;

wherein said control means determines a vertical speed of the sprung mass based on the vertical acceleration, determines a bouncing motion component based on the vertical speed, and further determines, in response to the vertical speed of the sprung mass, first and second bouncing control gains of which the second bouncing gain is smaller than the first control signal and is selected for softer damping when the vertical acceleration is greater than the preselected threshold value, and the first control signal being produced by multiplying the bouncing motion component by the first bouncing control gain, and the second control signal being produced by multiplying the bouncing motion component by the second bouncing control gain.

2. A suspension control system as set forth in claim 1, wherein the preselected threshold value is representative of a resonance frequency of the sprung mass of the vehicle.

3. A suspension control system as set forth in claim 1, wherein said control means further determines pitching and rolling motion components based on the vertical speed, the first control signals being respectively provided with the product of the bouncing motion component and the first bouncing control gain, the produce of the pitching motion component and a preselected pitching control gain, and the product of the rolling motion component and a preselected rolling control gain, the second control signals being respectively provided with the product of the bouncing motion component and the second bouncing control gain, the produce of the pitching motion component and the preselected pitching control gain, and the product of the rolling motion component and tile preselected rolling control gain.

4. A suspension control system as set forth in claim 3, wherein:

each of the shock absorbers is controlled to assume the damping force characteristics over a range of (a) a softer damping range wherein the lowest damping coefficients are established during both bounding and rebounding strokes of the shock absorber, (b) a rebounding harder damping range wherein the damping force characteristics are modified toward the higher damping coefficient only in the rebounding stroke without any change in the bounding stroke, and (c) a bounding harder damping range wherein the damping force characteristics are modified toward the higher damping coefficient only in the bounding stroke without any change in the rebounding stroke, said control means controlling the shock absorbers respectively to exhibit the damping force characteristics in the rebounding harder damping range HS when the vertical speed is in a direction of the rebounding stroke and to exhibit the damping force characteristics in the bounding harder damping range SII when the vertical speed is in a direction of the bounding stroke.

5. A suspension control system as set forth in claim 1, wherein said control means provides the second control signals to said shock absorbers respectively so that the damping force characteristics provided by the second damping coefficient are maintained until a preselected period of time is elapsed after the vertical acceleration is decreased below the preselected threshold value.

6. A suspension control system as set forth in claim 2, wherein said frequency component is derived by a filter which cuts off a lower frequency less than the unsprung resonance frequency included in the vertical acceleration.

7. A suspension control system as set forth in claim 6, wherein said control means determines vertical speed based on the signal from said vertical acceleration sensor means and relative speed between the vehicle body and the wheel, said control means controls each shock absorber so that the damping force characteristics of the lowest damping coefficient is provided when the vertical speed and the relative speed are in opposite directions of a stroke of the shock absorber, the damping force characteristics being modified to assume a damping coefficient increased toward the higher damping coefficient when the vertical speed and the relative speed are in the same direction of the stroke of the shock absorber.

8. A suspension control system as set forth in claim 7, wherein when the vertical speed and the relative speed are in the same direction of the stroke of the shock absorber and when said frequency component is smaller than the preselected threshold value, said control means controlling the shock absorbers respectively to assume the damping force characteristics provided by the first damping coefficient, when the vertical speed and the relative speed are in the same direction of the stroke of the shock absorber and when said frequency component is greater than the preselected threshold value, said control means controlling the shock absorbers respectively to assume the damping force characteristics provided by the second damping coefficient.

9. A suspension control system as set forth in claim 8, wherein said control means provides the second control signals to said shock absorbers respectively so that the damping force characteristics provided by the second damping coefficient are maintained until a preselected period of time is elapsed after the said frequency component is decreased below the preselected threshold value.

10. A suspension control system as set forth in claim 1, wherein said vertical acceleration sensor means determines vertical accelerations acting on portions of the vehicle body adjacent the shock absorbers respectively, said control means providing preselected control parameters based on the vertical accelerations respectively, said control means providing the first control signal to each shock absorber to modify the damping force characteristics so as to assume the first damping coefficient against the bouncing motion of the portion of the vehicle body adjacent the shock absorber when the control parameter is smaller than the preselected threshold value and the second control signal to each shock absorber to modify the damping force characteristics so as to assume the second damping coefficient against the bouncing motion when the control parameter is greater than the preselected threshold value.

* * * * *